US006968200B2

(12) United States Patent
Kuo

(10) Patent No.: US 6,968,200 B2
(45) Date of Patent: Nov. 22, 2005

(54) METHOD OF INITIALIZING HYPER-FRAME NUMBERS DURING AN ESTABLISHMENT OF A NEW RADIO BEARER IN A WIRELESS COMMUNICATION SYSTEM

(75) Inventor: Richard Lee-Chee Kuo, Hsin-Chu (TW)

(73) Assignee: ASUSTek Computer Inc., Taipei (TW)

( * ) Notice: Subject to any disclaimer, the term of this patent is extended or adjusted under 35 U.S.C. 154(b) by 502 days.

(21) Appl. No.: 10/064,866

(22) Filed: Aug. 26, 2002

(65) Prior Publication Data

US 2004/0038694 A1 Feb. 26, 2004

(51) Int. Cl.[7] ................................................ H04Q 7/20
(52) U.S. Cl. ....................... 455/515; 455/450; 455/410
(58) Field of Search ................................ 455/515, 450, 455/410, 411, 414.1, 422.1, 552.1, 432.1–432.3, 455/435.1–435.2; 370/337, 347, 335; 380/247

(56) References Cited

U.S. PATENT DOCUMENTS 6,728,529 B2 * 4/2004 Kuo et al. .................. 455/411
6,741,704 B1 * 5/2004 Virtanen ..................... 380/247
2002/0013147 A1 * 1/2002 Fauconnier et al. ..... 455/422.1

* cited by examiner

*Primary Examiner*—Nay Maung
*Assistant Examiner*—Philip J. Sobutka
(74) *Attorney, Agent, or Firm*—Winston Hsu

(57) ABSTRACT

A wireless communication system has a mobile unit, a UTRAN, and a plurality of established radio bearers. The UTRAN is used for transmitting a first control command to the mobile unit, and the first control command is used for triggering establishment of a new radio bearer between the mobile unit and the UTRAN. Each established radio bearer between the mobile unit and the UTRAN has a corresponding first HFN, which are used for ciphering. The mobile unit generates a first value based on the first HFNs of established radio bearers wherein the first value is at least as great as the x most significant bits ($MSB_x$) of each first HFN. Each of the mobile unit and the UTRAN sets $MSB_x$ of an initial HFN associated with the new radio bearer equal to the first value, regardless of whether or not the ciphering is "STARTED" or "NOT STARTED".

6 Claims, 3 Drawing Sheets

METHOD OF INITIALIZING HYPER-FRAME NUMBERS DURING AN ESTABLISHMENT OF A NEW RADIO BEARER IN A WIRELESS COMMUNICATION SYSTEM

BACKGROUND OF INVENTION

1. Field of the Invention

The present invention relates to an initialization of hyper-frame numbers (HFNs) in a wireless communication system. In particular, the present invention discloses a method of initializing HFNs during an establishment of a new radio bearer.

2. Description of the Prior Art

Please refer to FIG. 1. FIG. 1 is a simplified block diagram of a prior art wireless communications system, as defined by the $3^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications system includes a first station 10 in wireless communications with a second station 20. As an example, the first station 10 is a mobile unit, such as a cellular telephone, and the second station 20 is a base station. The first station 10 communicates with the second station 20 over a plurality of radio bearers 12. The second station 20 thus has corresponding radio bearers 22, one for each of the radio bearers 12. Each radio bearer 12 has a receiving buffer 12*r* for holding protocol data units (PDUs) 11*r* received from the corresponding radio bearer 22 of the second station 20. Each radio bearer 12 also has a transmitting buffer 12*t* for holding PDUs 11*t* that are awaiting transmission to the corresponding radio bearer 22 of the second station 20. A PDU 11*t* is transmitted by the first station 10 along a radio bearer 12 and received by the second station 20 to generate a corresponding PDU 21*r* in the receiving buffer 22*r* of the corresponding radio bearer 22. Similarly, a PDU 21*t* is transmitted by the second station 20 along a radio bearer 22 and received by the first station 10 to generate a corresponding PDU 11*r* in the receiving buffer 12*r* of the corresponding radio bearer 12.

For the sake of consistency, the data structures of each PDU 11*r*, 11*t*, 21*r* and 21*t* along corresponding radio bearer 12 and 22 are identical. That is, a transmitted PDU 11*t* generates an identical corresponding received PDU 21*r*, and vice versa. Furthermore, both the first station 10 and the second station 20 use identical PDU 11*t*, 21*t* data structures. Although the data structure of each PDU 11*r*, 11*t*, 21*r* and 21*t* along corresponding radio bearers 12 and 22 is identical, different radio bearers 12 and 22 may use different PDU data structures according to the type of connection agreed upon along the corresponding radio bearers 12 and 22. In general, though, every PDU 11*r*, 11*t*, 21*r* and 21*t* will have a sequence number 5*r*, 5*t*, 6*r*, 6*t*. The sequence number 5*r*, 5*t*, 6*r*, 6*t* is an m-bit number that is incremented for each PDU 11*r*, 11*t*, 21*r*, 21*t*. The magnitude of the sequence number 5*r*, 5*t*, 6*r*, 6*t* indicates the sequential ordering of the PDU 11*r*, 11*t*, 21*r*, 21*t* in its buffer 12*r*, 12*t*, 22*r*, 22*t*. For example, a received PDU 11*r* with a sequence number 5*r* of 108 is sequentially before a received PDU 11*r* with a sequence number 5*r* of 109, and sequentially after a PDU 11*r* with a sequence number 5*r* of 107. The sequence number 5*t*, 6*t* is often explicitly carried by the PDU 11*t*, 21*t*, but may also be implicitly assigned by the station 10, 20. For example, in an acknowledged mode setup for corresponding radio bearers 12 and 22, each transmitted PDU 11*t*, successful reception of which generates an identical corresponding PDU 21*r*, is confirmed as received by the second station 20. Ideally, the sequence numbers 5*t* maintained by the first station 10 for the PDUs 11*t* are identical to the corresponding sequence numbers 6*r* for the PDUs 21*r* that are maintained by the second station 20.

Hyper-frame numbers (HFNs) are also maintained by the first station 10 and the second station 20. Hyper-frame numbers may be thought of as high-order (i.e., most significant) bits of the sequence numbers 5*t*, 6*t*, and which are never physically transmitted with the PDUs 11*t*, 21*t*. Exceptions to this rule occur in rare cases of special signaling PDUs 11*t*, 21*t* that are used for synchronization. In these cases, the HFNs are not carried as part of the sequence number 11*t*, 21*t*, but instead are carried in fields of the data payload of the signaling PDU 11*t*, 21*t*, and thus are more properly signaling data. As each transmitted PDU 11*t*, 21*t* generates a corresponding received PDU 21*r*, 11*r*, hyper-frame numbers are also maintained for received PDUs 11*r*, 21*r*. In this manner, each received PDU 11*r*, 21*r*, and each transmitted PDU 11*t*, 21*t* is assigned a value that uses the sequence number (implicitly or explicitly assigned) 5*r*, 6*r*, and 5*t*, 6*t* as the least significant bits, and a corresponding hyper-frame number (always implicitly assigned) as the most significant bits. Each radio bearer 12 of the first station 10 thus has a receiving hyper-frame number ($HFN_R$) 13*r* and a transmitting hyper-frame number ($HFN_T$) 13*t*. Similarly, the corresponding radio bearer 22 on the second station 20 has a $HFN_R$ 23*r* and a $HFN_T$ 23*t*. When the first station 10 detects rollover of the sequence numbers 5*r* of PDUs 11*r* in the receiving buffer 12*r*, the first station 10 increments the $HFN_R$ 13*r*. On rollover of sequence numbers 5*t* of transmitted PDUs 11*t*, the first station 10 increments the $HFN_T$ 13*t*. A similar process occurs on the second station 20 for the $HFN_R$ 23*r* and $HFN_T$ 23*t*. Ideally, the $HFN_R$ 13*r* of the first station 10 should thus be synchronized with (i.e., identical to) the $HFN_T$ 23*t* of the second station 20. Similarly, the $HFN_T$ 13*t* of the first station 10 should be synchronized with (i.e., identical to) the $HFN_R$ 23*r* of the second station 20.

A security engine 14 on the first station 10, and a corresponding security engine 24 on the second station 20, together ensure secure and private exchanges of data exclusively between the first station 10 and the second station 20. The security engine 14, 24 is used for performing the obfuscation (i.e., ciphering, or encryption) of data held within a PDU 11*t*, 21*t* so that the corresponding PDU 11*r*, 21*r* presents a meaningless collection of random numbers to an eavesdropper. For transmitting a PDU 11*t*, the security engine 14 uses, amongst other inputs, an n-bit security count 14*c* and a security key 14*k* to perform the ciphering functions upon the PDU 11*t*. To properly decipher the corresponding PDU 21*r*, the security engine 24 must use an identical security count 24*c* and security key 24*k*. To start the ciphering upon the radio bearers 12,22, the second station 20 has to send a "SECURITY MODE COMMAND" message to the first station 10. Each of the first station 10 and the second station 20 has a corresponding variable CIPHERING_STATUS 16, 26 respectively to record a ciphering status as "STARTED" or "NOT STARTED". For example, the variable CIPHERING_STATUS 26 is initially set to "NOT STARTED" before the ciphering is started between the first and second stations 10, 20. When the first station 10 receives the "SECURITY MODE COMMAND" command from the second station 20 that indicates that ciphering should be activated, the variable CIPHERING_STATUS 16 is set to "STARTED". The CIPHERING_STATUS 16 is initially set to "NOT STARTED" until the second station 20 sends the "SECU- RITY MODE COMMAND" message to the first station 10 for starting the ciphering. In addition, after the first station 10 is ready to perform the ciphering upon PDUs, the variable CIPHERING_STATUS 26 of the second station 20 will be set to "STARTED". That is, the variables CIPHERING_STATUS 16 and the CIPHERING_STATUS 26 are synchronized to make the ciphering between the first and second stations 10, 20 operate correctly. If there are a plurality of first stations 10 each having a specific variable CIPHERING_STATUS 16 to indicate the corresponding ciphering status between the first station 10 and the second station 20, the second station 20, therefore, has to establish a plurality of variables CIPHERING_STATUS 26 each being synchronized with one variable CIPHERING_STATUS 16 of each first station 10 for transmitting and receiving PDUs correctly.

The security count 14*c* for a PDU 11*t* is generated by using the sequence number 5*t* of the PDU 11*t* as the least significant bits of the security count 14*c*, and the $HFN_T$ 13*t* associated with the sequence number 5*t* as the most significant bits of the security count 14*c*. Similarly, the security count 14*c* for a PDU 11*r* is generated from the sequence number 5*r* of the PDU 11*r* and the $HFN_R$ 13*r* of the PDU 11*r*. An identical process occurs on the second station 20, in which the security count 24*c* is generated using the sequence number 6*r* or 6*t*, and the appropriate $HFN_R$ 23*r* or $HFN_T$ 23*t*. The security count 14*c*, 24*c* has a fixed bit size, which is typically 32 bits. As the sequence numbers 5*r*, 6*r*, 5*t*, 6*t* may vary in bit size depending upon the transmission mode used, the hyper-frame numbers $HFN_R$ 13*r*, $HFN_R$ 23*r*, $HFN_T$ 13*t* and $HFN_T$ 23*t* must vary in bit size in a corresponding manner to yield the fixed bit size of the security count 14*c*, 24*c*. For example, in a transparent transmission mode, the sequence numbers 5*r*, 6*r*, 5*t*, 6*t* are all 7 bits in size. The hyper-frame numbers $HFN_R$ 13*r*, $HFN_R$ 23*r*, $HFN_T$ 13*t* and $HFN_T$ 23*t* are thus 25 bits in size; combining the two together yields a 32 bit security count 14*c*, 24*c*. On the other hand, in an acknowledged transmission mode, the sequence numbers 5*r*, 6*r*, 5*t*, 6*t* are all 12 bits in size. The hyper-frame numbers $HFN_R$ 13*r*, $HFN_R$ 23*r*, $HFN_T$ 13*t* and $HFN_T$ 23*t* are thus 20 bits in size so that combining the two together continues to yield a 32 bit security count 14*c*, 24*c*.

As noted, the first station 10 may establish a plurality of radio bearers 12 with the second station 20. Each of these radio bearers 12 uses its own sequence numbers 5*r* and 5*t*, and hyper-frame numbers 13*r* and 13*t*. When establishing a new radio bearer 12, the first station 10 calculates an START value by considering the $HFN_T$ 13*t* and $HFN_R$ 13*r* of all currently established radio bearers 12, and selects the $HFN_T$ 13*t* or $HFN_R$ 13*r* having the highest value and add one to the value. The START value is stored in a variable START_VALUE_TO_TRANSMIT. Then, the variable START_VALUE_TO_TRANSMIT is sent to the second station 20 in a "RADIO BEARER SETUP COMPLETE" message. However, if the variable "CIPHERING_STATUS" is set to "NOT STARTED", the initial value is calculated based on the $HFN_T$ 13*t* and $HFN_R$ 13*r* of all currently established radio bearers 12, but is not used for initializing the $HFN_T$ 13*t* and the $HFN_R$ 13*r* for the new radio bearer 12. That is, the $HFN_T$ 3*t* and the $HFN_R$ 13*r* are initialized by the calculated initial value only when the variable "CIPHERING_STATUS" 16 is set to "STARTED". Generally speaking, The first station 10 then extracts the $MSB_x$ of this highest-valued hyper-frame number 13*r*, 13*t*, increments the $MSB_x$ by one, and uses it as the $MSB_x$ for the new $HFN_T$ 13*t* and $HFN_R$ 13*r* for a newly established radio bearer 12 with a corresponding variable "CIPHERING_STATUS" set to "STARTED". Synchronization is then performed between the first station 10 and the second station 20 to provide the $MSB_x$ to the second station 20 for the $HFN_R$ 23*r* and $HFN_T$ 23*t*.

However, the establishment of a new radio bearer 12 may generate a problem when considering the possibility of the variable CIPHERING_STATUS being set to "NOT STARTED". Please refer to FIG. 2, which is a flow chart related to a prior art establishment of the radio bearer 12. Establishing a new radio bearer 12 has the following steps.

Step 101:

The second station 20 transmits a "RADIO BEARER SETUP" message to the first station 10 for triggering an establishment of a new radio bearer 12;

Step 102: The first station 10 calculates a START value;

Step 103:

The first station 10 checks whether the variable CIPHERING_STATUS is set to "STARTED" or "NOT STARTED". If the status is "STARTED" for the new radio bearer 12, go to Step 104; otherwise, go to Step 105;

Step 104: Use the START value to initialize the HFNs related to the new radio bearers 12;

Step 105:

The first station 10 transmits a "RADIO BEARER SETUP COMPLETE" message, which contains the START value, to the second station 20 to inform the second station 20 that the new radio bearer 12 has been successfully established.

As mentioned above, when a new radio bearer is established, HFNs 13*r* and 13*t* will be initialized with the variable START_VALUE_TO_TRANSMIT if the CIPHERING_STATUS is set to "STARTED". However, when a new radio bearers 12 is created with the variable CIPHERING_STATUS set to "NOT STARTED", an initial value for the $HFN_R$ 13*r* and $HFN_T$ 13*t* is calculated, but no HFN 13*r*, 13*t* is initialized by the calculated value. Because the CIPHERING_STATUS is set to "NOT STARTED", ciphering is disabled, and the corresponding security count 14*c* is not maintained. In addition, the HFNs 13*r*, 13*t* for the new radio bearer 12, not having been initialized, are effectively random numbers. Consider the situation in which a great number of PDUs 11*t* are transmitted from the first station 10 to the second station 20, resulting in the related $HFN_T$ 13*t* increasing in value. The first station 10 may later receive the "SECURITY MODE COMMAND" message from the second station 20, intending to start the ciphering. Because the $HFN_R$ 13*r* and $HFN_T$ 13*t* were not initialized when the radio bearer 12 was established, the HFNs 13*r*, 13*t* are random and meaningless numbers. In addition, the HFNs 13*r*, 13*t* are not initialized when the "SECURITY MODE COMMAND" message has been transmitted and received. It can be expected, then, that the $HFN_R$ 13*r* and $HFN_T$ 23*t* are not synchronized, and that the $HFN_R$ 23*r* and $HFN_T$ 13*t* are also not synchronized. Consequently, when the "SECURITY MODE COMMAND" message is sent by the second station 20, a corresponding ciphering function fails along the new radio bearer 12 between the first station 10 and the second station 20 due to the unsynchronized HFNs for the new radio bearer 12 between the first and second stations 10, 20. Besides, the prior art does not teach or mention about initializing the HFNs of the ever established radio bearers when the first station 10 later receives the "SECURITY MODE COMMAND" message to start the ciphering operation. However, it is not reasonable trying to initialize HFNs by the variable START_VALUE_TO_TRANSMIT at this time to solve the above-mentioned problem since the variable START_VALUE_TO_TRANSMIT that stores the original calculated START value might have been altered owing to new establishments of other radio bearers between the first station 10 and the second station 20. That is, the original calculated START value of the target radio bearer might be lost when the first station 10 later receives the "SECURITY MODE COMMAND" message for the target radio bearer.

For the sake of ensuring secure data transmission, the second station 20 may also trigger a counter check procedure to perform a local authentication. The purpose of the procedure is to check that the amount of data sent in both directions, that is, from the second station 20 to the first station 10 and from the first station 10 to the second station 20, over a duration of the established radio bearer 12 is identical at the first and second stations 10, 20. The procedure is helpful for detecting a possible intruder. It is obvious that the security count 14*c*, 24*c* containing an HFN and an SN related to a PDU can be used to calculate total amount of transmitted data. Whether the ciphering is activated or not, the security count 14*c*, 24*c*, should be possible at all the times during the existence of the radio bearer 12. As mentioned above, the security count 14*c* is a random number when the variable CIPHERING_STATUS is set to "NOT STARTED" during establishment of the new radio bearer 12. Therefore, the counter check procedure will not function correctly for the new radio bearer 12.

SUMMARY OF INVENTION

It is therefore a primary objective of the present invention to provide a method of initializing HFNs during establishment of a new radio bearer in a wireless communication system so as to maintain synchronization of the HFNs even if the ciphering has not been started.

Briefly summarized, the preferred embodiment of the present invention discloses a method for setting an initial hyper frame number (HFN) for a new radio bearer in a wireless communication system. The wireless communication system has a mobile unit, a base station, and a plurality of established radio bearers. The base station is used for transmitting a first control command to the mobile unit, and the first control command is used for triggering establishment of the new radio bearer between the mobile unit and the base station. Each established radio bearer between the mobile unit and the base station has a corresponding first HFN. The mobile unit generates a first value based on the first HFNs of established radio bearers wherein the first value is at least as great as the x most significant bits ($MSB_x$) of each first HFN. Each of the mobile unit and the base station sets the $MSB_x$ of an initial HFN associated with the new radio bearer equal to the first value, regardless of the status of the CIPHERING_STATUS variable.

It is an advantage of the present invention that by initializing HFNs associated with a new radio bearer regardless of whether or not the ciphering is started or not for the new radio bearer, proper synchronization of the HFNs with the base station is ensured. It is a further advantage that this also leads to proper operation of a counter check procedure.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
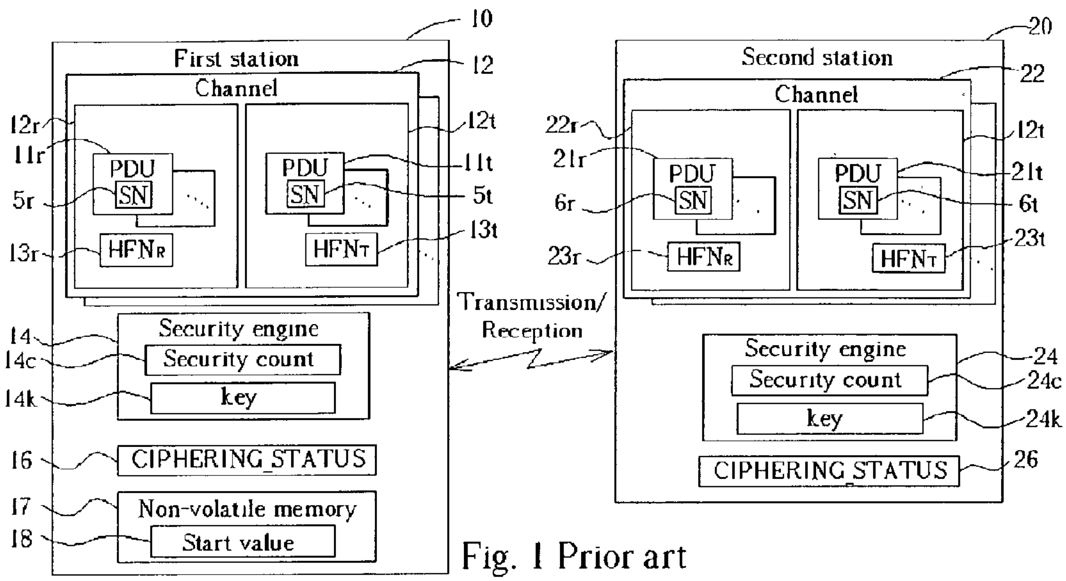
FIG. 1 is a simplified block diagram of a prior art wireless communications system.
Figure 2:
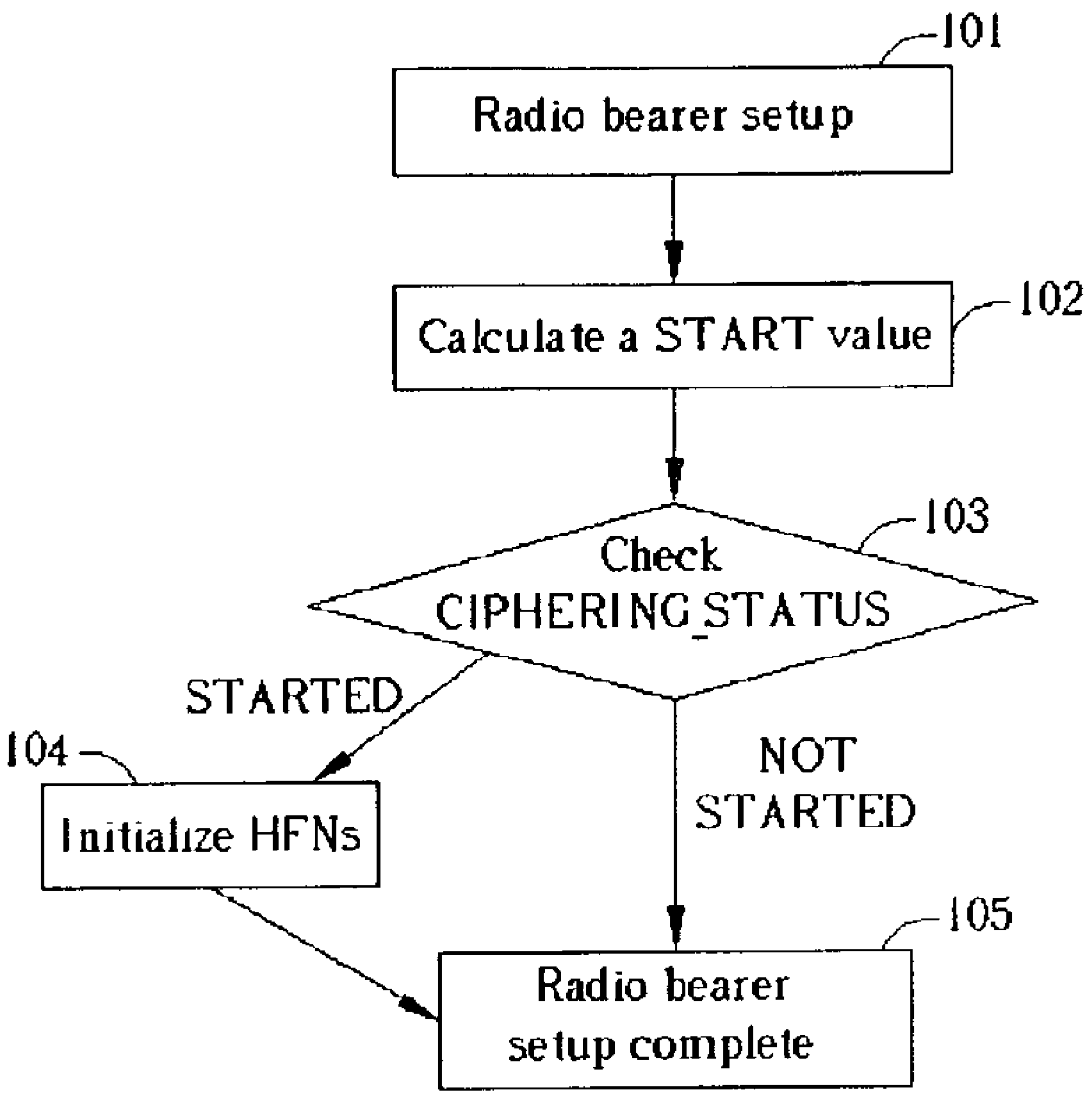
FIG. 2 is a flow chart related to a prior art establishment of the radio bearer.
Figure 3:
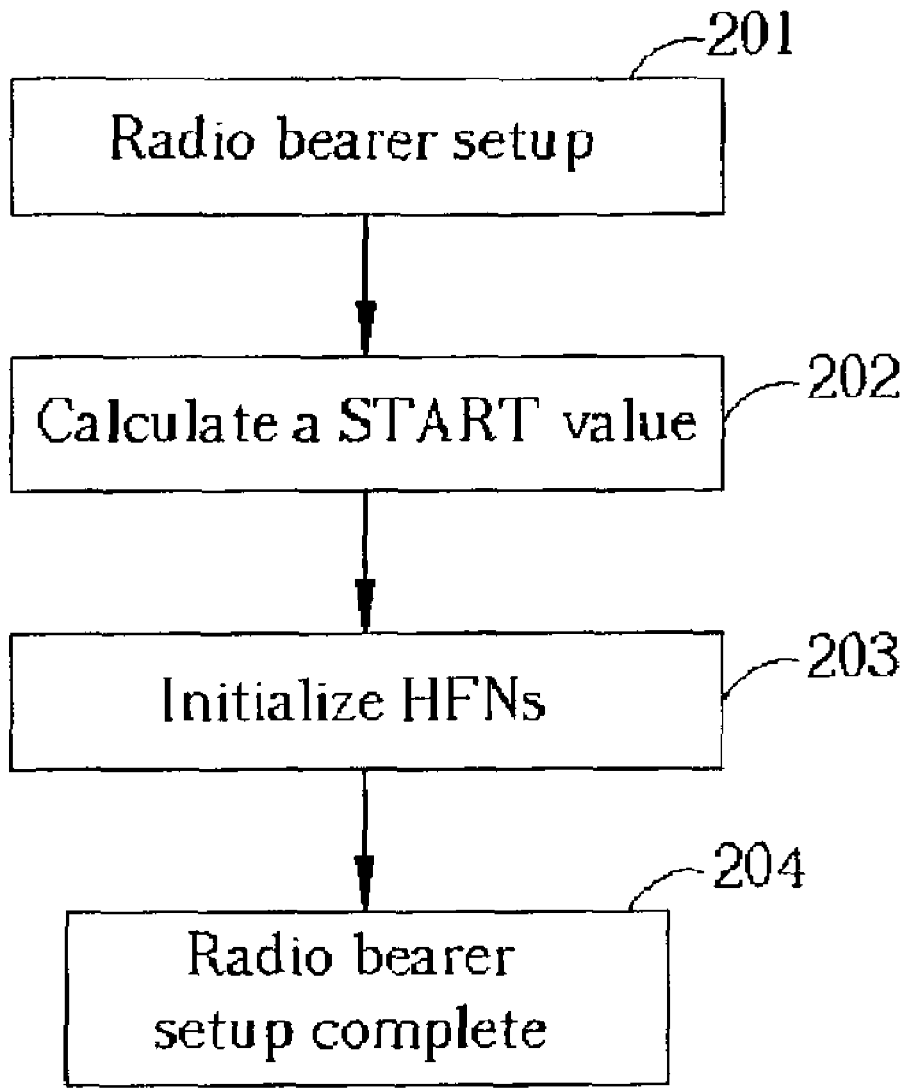
FIG. 3 is a flow chart related to establishment of the radio bearer shown in FIG. 1 according to the method of the present invention.

Please refer to FIG. 1 and FIG. 3. FIG. 3 is a flow chart related to establishment of the radio bearer 12 shown in FIG. 1 according to the method of the present invention. In the preferred embodiment, the establishment of the radio bearer 12 has following steps.

Step 201: The second station 20 transmits a "RADIO BEARER SETUP" message to the first station 10 for triggering an establishment of a new radio bearer 12; Step 202: The first station 10 calculates a START value; Step 203: The first station 10 uses the START value to initialize HFNs related to the new radio bearer 12, regardless of the state of the CIPHERING_STATUS variable; Step 204: The first station 10 transmits a "RADIO BEARER SETUP COMPLETE" message, which contains the START value, to the second station 20 to inform the second station 20 that the new radio bearer 12 has been successfully established.

The operation of the preferred embodiment is described as follows. When a new radio bearer 12, 22 is to be established, the second station 20 will send a "RADIO BEARER SETUP" message to the first station 10. When the first station 10 receives the "RADIO BEARER SETUP" message, the first station 10 calculates an initial value for the HFNs 13*r*, 13*t* first. Initially, there are no established radio bearers 12 and 22 between the first station 10 and the second station 20. The first station 10 thus establishes a radio bearer 12 with the second station 20. Therefore, the first station 10 must determine the initial value. The first station 10 references a non-volatile memory 17, such as a flash memory device or a SIM card, for a START value 18 and uses the START value 18 to generate and set the initial value for the $HFN_T$ 13*t* and the $HFN_R$ 13*r*, regardless of whether or not the variable "CIPHERING_STATUS" is "STARTED" or "NOT STARTED". That is, when the first station 10 is powered on, the START value 18 stored in the SIM card is used for initializing the $HFN_T$ 13*t* and the $HFN_R$ 13*r* for a new radio bearer in the preferred embodiment. Therefore, the START value is obtained with absence of the security counts and the integrity counts in the beginning as mentioned above. The start value 18 holds the x most significant bits ($MSB_x$) of a hyper-frame number from a previous session along a radio bearer 12. Ideally, x should be at least as large as the bit size of the smallest-sized hyper-frame number (i.e., for the above example, x should be at least 20 bits in size). The $MSB_x$ of the $HFN_T$ 13*t* and the $HFN_R$ 13*r* are set to the START value 18, and the remaining low order bits are set to zero. After the setting related to the new radio bearer 12 is done, the first station 10 will transmit a "RADIO BEARER SETUP COMPLETE" message to the second station 20. The variable START_VALUE_TO_TRANSMIT stores the START value 18 related to the newly created radio bearer, and is included in the "RADIO BEARER SETUP COMPLETE" message. In doing so, the first station 10 transmits the START value 18 embedded in the "RADIO BEARER SETUP COMPLETE" message to the second station 20 for use as the $HFN_R$ 23r and the $HFN_T$ 23t. In this manner, the $HFN_T$ 13t is synchronized with the $HFN_R$ 23r, and the $HFN_T$ 23t is synchronized with the $HFN_R$ 13r when the new radio bearer 12 is established.

As noted, the first station 10 may have established a plurality of radio bearers 12 with the second station 20. Each of these radio bearers 12 uses its own sequence numbers 5r and 5t, and hyper-frame numbers 13r and 13t. When establishing a new radio bearer 12, the first station 10 considers the $HFN_T$ 13t and $HFN_R$ 13r of all currently established radio bearers 12, and selects the $HFN_T$ 13t or $HFN_R$ 13r having the highest value. The first station 10 then extracts the $MSB_x$ of this highest-valued hyper-frame number 13r, 13t, increments the $MSB_x$ by one, and uses it as a calculated START value 18 for the $MSB_x$ for the new $HFN_T$ 13t and $HFN_R$ 13r for a newly established radio bearer 12. The $HFN_T$ 13t and $HFN_R$ 13r for the newly established radio bearer 12, which is being established in response to the "RADIO BEARER SETUP" message from the second station 20, are initialized using this calculated START value 18, regardless of the state of the CIPHERING_STATUS variable 16. The first station 10 then embeds the calculated START value 18 in a "RADIO BEARER SETUP COMPLETE" message, which is transmitted to the second station 20. Synchronization is thus ensured between the first station 10 and the second station 20 to provide the $MSB_x$ to the second station 20 for the $HFN_R$ 23r and $HFN_T$ 23t. The $HFN_T$ 13t is synchronized with the $HFN_R$ 23r, and the $HFN_T$ 23t is synchronized with the $HFN_R$ 13r when the new radio bearer 12 is established, regardless of whether or not the variable CIPHERING_STATUS 16 is set to "STARTED" or "NOT STARTED". Consequently, the security counts 14c, 24c in the preferred embodiment are initialized and synchronized when a new radio bearer 12 is established.

When the second station 20 activates the counter check procedure to perform a corresponding authentication, the counter check procedure works because the security counts 14c, and 24c are maintained with HFNs that are guaranteed to be initialized and synchronized from the establishment time of the new radio bearer 12, 22. That is, the HFNs 13r, 13t are initialized even though the variable CIPHERING_STATUS is set to "NOT STARTED" when the new radio bearer 12 is established, indicating that no ciphering is to be performed along the new radio bearer 12. Therefore, the security counts 14c, and 24c are initialized with the synchronized HFNs so that the counter check procedure can check the amount of data transmitted between the first station 10 and the second station 20 with the help of initialized security counts 14c, and 24c, even though the ciphering has not yet been activated.

In contrast to the prior art, the method according to the present invention initializes the HFNs when a new radio bearer is established, regardless of the state of the CIPHERING_STATUS variable. That is, an initial value is calculated and is assigned to the HFNs related to the new radio bearer, regardless of whether the CIPHERING_STATUS is set to "STARTED" or "NOT STARTED". The HFNs related to the new radio bearer are thus synchronized and initialized after the establishment of the new radio bearer so that the counter check procedure requiring a security count will work normally even though the ciphering not activated.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for setting an initial hyper frame number (HFN) for a new radio bearer in a wireless communication system, the wireless communication system comprising:

a mobile unit maintaining a status variable capable of assuming a NOT STARTED state indicating that a ciphering is not to be performed along the new radio bearer, and a STARTED state that indicates that the ciphering is to be performed along the new radio bearer;

a universal terrestrial radio access network (UTRAN) for transmitting a first control command to the mobile unit, the first control command used for triggering establishment of the new radio bearer between the mobile unit and the UTRAN; and a plurality of established radio bearers, each established radio bearer between the mobile unit and the UTRAN having a corresponding first HFN;

the method comprising:

the UTRAN sending the first control command to the mobile unit to establish the new radio bearer;

in response to receiving the first control command, the mobile unit generating a first value based on the first HFNs of the established radio bearers, the first value being at least as great as the x most significant bits ($MSB_x$) of each first HFN; and in response to receiving the first control command, the mobile unit setting the $MSB_x$ of the initial HFN of the new radio bearer equal to the first value while the status variable is set to the NOT STARTED state.

2. The method of claim 1 wherein the UTRAN is further used for transmitting a second control command to change the status variable to trigger the ciphering upon each radio bearer between the UTRAN and the mobile unit, and the first control command is transmitted from the UTRAN to the mobile unit prior to the second control command.

3. A method for setting an initial hyper frame number (HFN) for a new radio bearer in a wireless communication system, the wireless communication system comprising:

a mobile unit maintaining a status variable capable of assuming a NOT STARTED state indicating that the ciphering is not to be performed along the new radio bearer, and a STARTED state that indicates that a ciphering is to be performed along the new radio bearer; and a universal terrestrial radio access network (UTRAN) for transmitting a first control command to the mobile unit, the first control command used for triggering establishment of the new radio bearer between the mobile unit and the UTRAN;

the method comprising:

the UTRAN sending the first control command to the mobile unit to establish the new radio bearer;

in response to receiving the first control command, the mobile unit generating a first value based on a reference value, the first value being at least as great as the x most significant bits ($MSB_x$) of an initial HFN of the new radio bearer; and in response to receiving the first control command, the mobile unit setting the $MSB_x$ of the initial HFN of the new radio bearer equal to the first value while the status variable is set to the NOT STARTED state.

4. The method of claim 3 wherein the reference value is stored in a non-volatile memory positioned on the mobile unit.

5. The method of claim 4 wherein the non-volatile memory is a SIM card.

6. The method of claim 3 wherein the UTRAN is further used for transmitting a second control command to change the status variable to trigger the ciphering upon each radio bearer between the UTRAN and the mobile unit, and the first control command is transmitted from the UTRAN to the mobile unit prior to the second control command.

* * * * *